(12) United States Patent
Chang et al.

(10) Patent No.: US 8,806,392 B2
(45) Date of Patent: Aug. 12, 2014

(54) DISTINGUISHABLE IC PATTERNS WITH ENCODED INFORMATION

(71) Applicant: Taiwan Semiconductor Manufacturing Company, Ltd., Hsin-Chu (TW)

(72) Inventors: Shih-Ming Chang, Zhubei (TW); Tzu-Chin Lin, Hsinchu (TW); Jen-Chieh Lo, New Taipei (TW); Yu-Po Tang, Taipei (TW); Tsong-Hua Ou, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/692,845

(22) Filed: Dec. 3, 2012

(65) Prior Publication Data
US 2014/0157212 A1    Jun. 5, 2014

(51) Int. Cl.
*G06F 17/50* (2006.01)

(52) U.S. Cl.
USPC .............. 716/53; 716/54; 716/118; 716/119

(58) Field of Classification Search
USPC ........................................................... 716/53
See application file for complete search history.

(56) References Cited

U.S. PATENT DOCUMENTS

2007/0011628 A1 *  1/2007  Ouali et al. ................. 716/2
2011/0278679 A1 * 11/2011  Tabata et al. ............. 257/390

* cited by examiner

*Primary Examiner* — Vuthe Siek
*Assistant Examiner* — Eric Lee
(74) *Attorney, Agent, or Firm* — Haynes and Boone, LLP

(57) ABSTRACT

A method of designing an IC design layout having similar patterns filled with a plurality of indistinguishable dummy features, in a way to distinguish all the patterns, and an IC design layout so designed. To distinguish each pattern in the layout, deviations in size and/or position from some predetermined equilibrium values are encoded into a set of selected dummy features in each pattern at the time of creating dummy features during the design stage. By identifying such encoded dummy features and measuring the deviations from image information provided by, for example, a SEM picture of a wafer or photomask, the corresponding pattern can be located in the IC layout. For quicker and easier identification of the encoded dummy features from a given pattern, a set of predetermined anchor dummy features may be used.

20 Claims, 9 Drawing Sheets

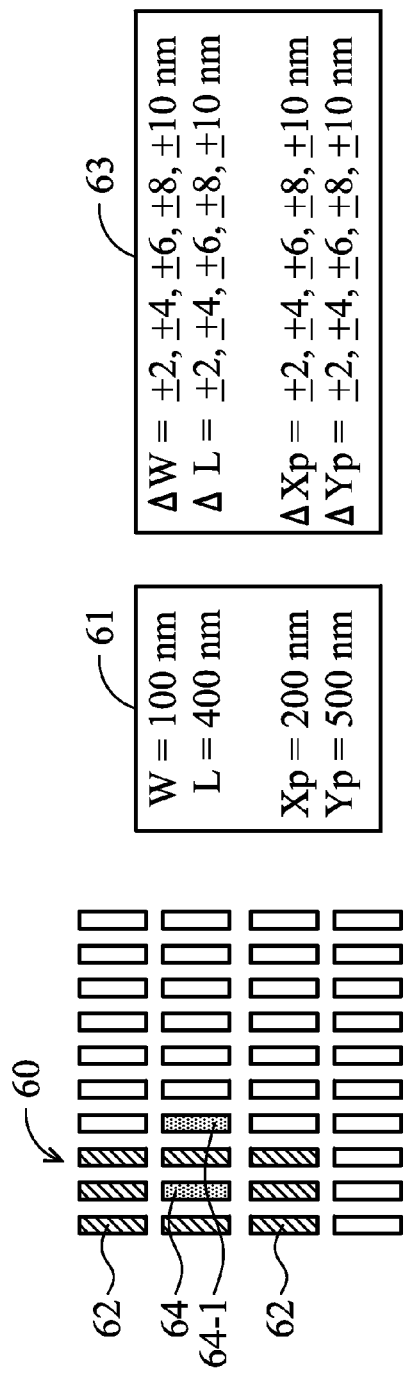
Fig. 6a
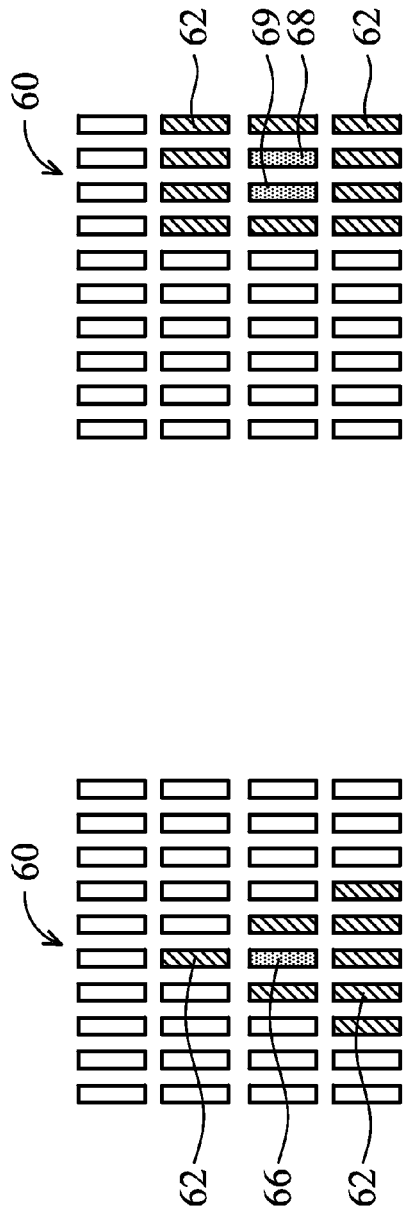
Fig. 6b
Fig. 6c
W = 100 nm
L = 400 nm
Xp = 200 nm
Yp = 500 nm
ΔW = ±2, ±4, ±6, ±8, ±10 nm
ΔL = ±2, ±4, ±6, ±8, ±10 nm
ΔXp = ±2, ±4, ±6, ±8, ±10 nm
ΔYp = ±2, ±4, ±6, ±8, ±10 nm

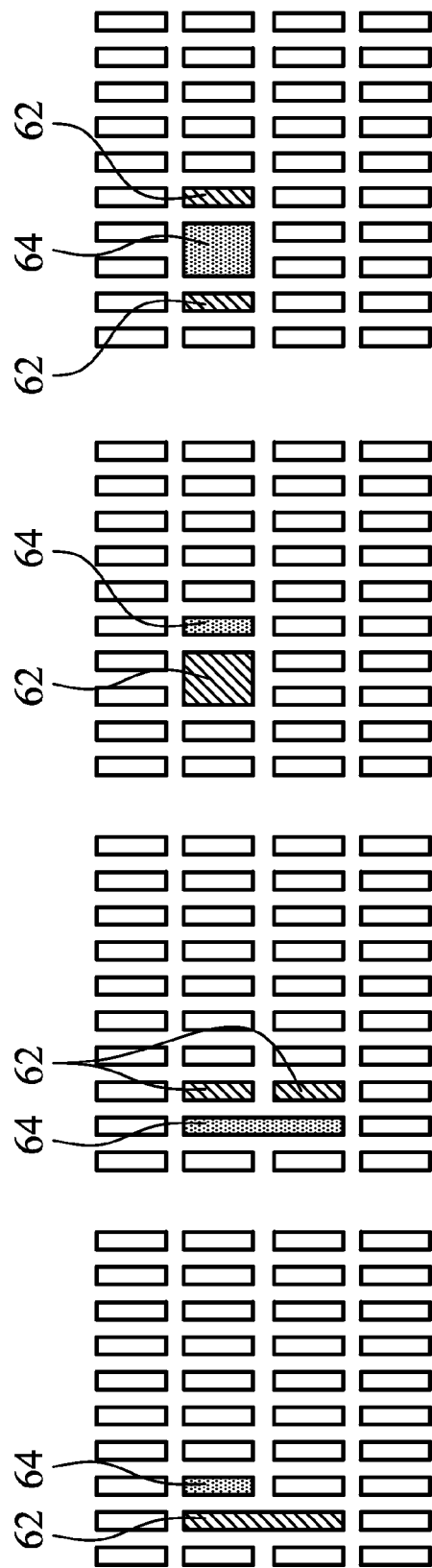

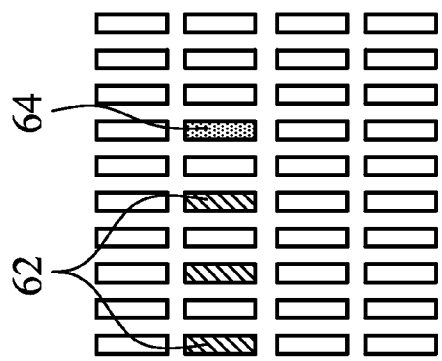
Fig. 8d
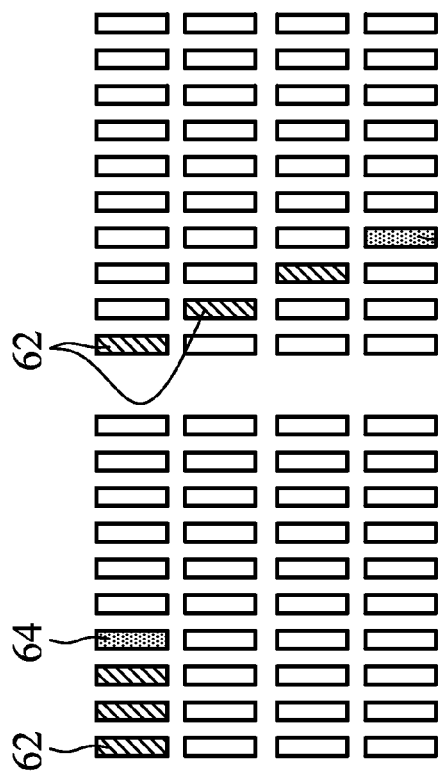
Fig. 8c
Fig. 8b
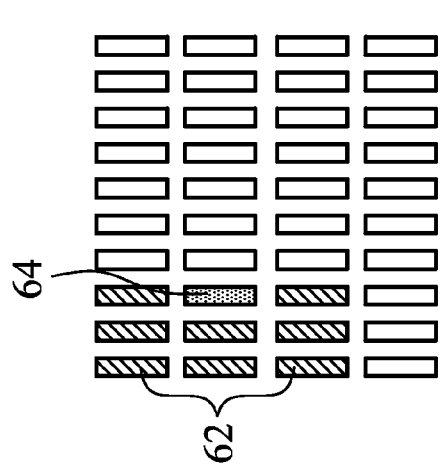
Fig. 8a

DISTINGUISHABLE IC PATTERNS WITH ENCODED INFORMATION

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC processing and manufacturing are needed.

An integrated circuit layout, also referred to as an IC layout, mask layout, or mask design, is the representation of an integrated circuit in terms of planar geometric shapes which correspond to the patterns of metal, oxide, or semiconductor layers that make up the components of the integrated circuit. An IC layout is generated after numerous steps of an IC design, also called a "data preparation stage," and a series of checks in a process, called "physical verification," at the end. The most common checks in this verification process are design rule checking (DRC), layout versus schematic (LVS), parasitic extraction, antenna rule checking, and electrical rule checking (ERC). When all verification is complete, the data in the IC layout is translated into an industry standard format, typically a vector-based format, such as GDSII or OASIS, and sent to a semiconductor foundry, called a fab house. The foundry then converts, via mask data preparation (MDP) procedure, the data into a set of instructions by which a photomask writer can generate a physical mask (a photomask) to be used in a photolithographic process of semiconductor device fabrication. More recent MDP procedures require the additional steps associated with design for manufacturability such as, resolution enhancement technologies (RET) and optical proximity correction (OPC). By using a series of photomasks, in addition to other processes, a wafer having one or more die (chips) is fabricated.

In order to ensure the fabrication processes are functioning properly, it is important to examine or test a wafer or dies for any defects or deficiencies before they are turned into finished devices. Some defects or deficiencies can be attributed to a semiconductor process, and some can be attributed to a defect or deficiency on one or more of the photomasks. Thus, it is often important to determine where on an IC design layout that particular defect of deficiency is located. When using a standard process, the behavior of the final integrated circuit depends largely on the positions and interconnections of the geometric shapes in the IC layout. A layout designer's job is to place and connect all the components that make up a chip so that they meet all criteria such as performance, size, and manufacturability. Therefore, an inadequately designed layout in the data preparation stage may cause a defect or deficiency in semiconductor devices on a wafer or die in fabrication stage.

For this reason, in many cases it is needed to exactly locate a particular pattern on an IC layout, which may be responsible for some defect or deficiency observed on a wafer or die. The location information of that particular pattern may be obtained from various known metrology tools, which, however, may not be accurate enough. For more accurate location information of a particular pattern, SEM (Scanning Electron Microscope) pictures, directly taken from a die or wafer, may be used to provide image information. In many occasions, however, such image information from SEM pictures is still limited in its ability to provide precise location information of a particular pattern if the area on an IC layout that is being examined and searched is filled with similar looking patterns, such as CMP (chemical mechanical polishing/planarization) dummy features, and the particular pattern shown on the SEM picture happens to be one of them. Since dummy features are identical through entire field of view or even through entire die, to distinguish a group of dummy features or patterns by image information from SEM pictures alone is extremely difficult and virtually impossible.

Accordingly, what is needed is a method to generate patterns that contains encoded visual distinctions that would be carried into photomasks, wafers, and dies so that when there is a need to locate a particular pattern on the layout from image information, such as SEM pictures, it can be more-quickly and easily located via a specific encoded distinction.

BRIEF DESCRIPTION OF THE DRAWINGS

The present disclosure is best understood from the following detailed description when read with accompanying figures. It is emphasized that, in accordance with the standard practice in the industry, various features in the drawings are not drawn to scale and are used for illustration purpose only. In fact, the dimension of the various features may be arbitrarily increased or reduced for clarity of discussion.

FIGS. 6 (*a*), (*b*), (*c*) show examples of a pattern to be designed according an aspect of the present disclosure;

FIGS. 7 (*a*), (*b*), (*c*), (*d*) show examples of a pattern to be designed according an aspect of the present disclosure;

FIGS. 8 (*a*), (*b*), (*c*), (*d*) show examples of a pattern to be designed according an aspect of the present disclosure.

DETAILED DESCRIPTION

Figure 1A:
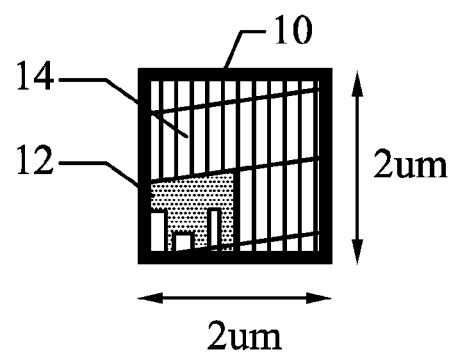
FIGS. 1 (*a*) and (*b*) show, respectively, image information of a first pattern from a SEM picture, and a first portion of an IC design layout being searched to locate the pattern.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1B:
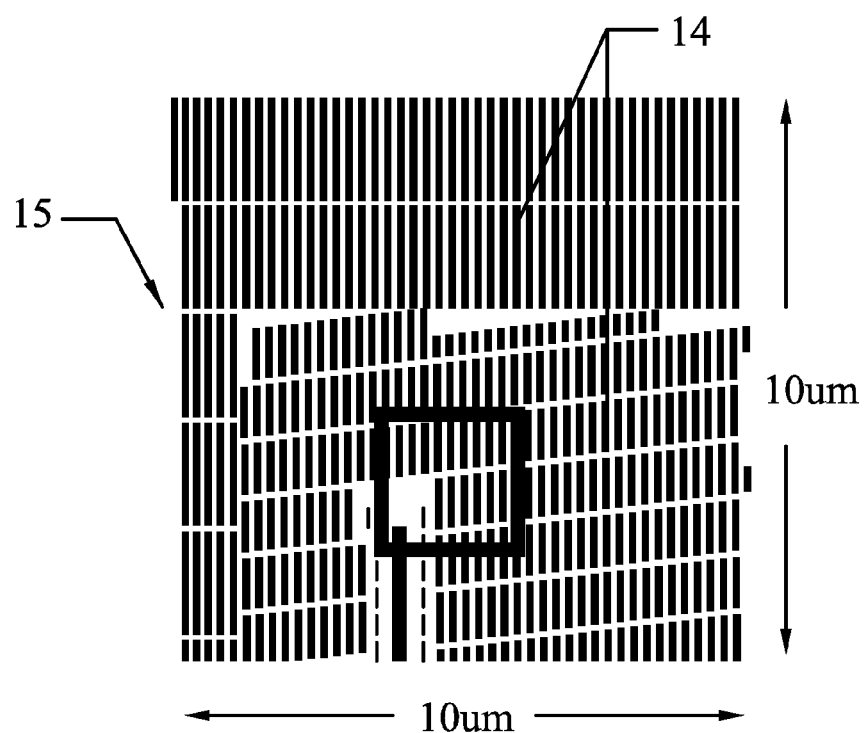

FIG. 1(a) shows image information of a first pattern 10. The image information may be provided by an inspection device such as a SEM (Scanning Electron Microscope) picture taken from a portion of a wafer or a die that contains some defect or deficiency. For a SEM of a typical Field Of View ("FOV"), one SEM picture may have a dimension of 2 micrometer ("μm") by 2 micrometer as in FIG. 1(a). FIG. 1(b) shows a first portion 15 of an IC design layout that is being examined and searched to locate a pattern thereon that corresponds to the pattern 10 in the SEM picture of FIG. 1(a). The IC portion 15, which can be captured into a FOV of a typical SEM detecting device, may have a dimension of 10 μm by 10 μm as in FIG. 1(b).

The IC design layout is presented in one or more data files having the information of the geometrical patterns. In one example, the IC design layout is expressed in a vector based format such as a "GDS" format. The designer, based on the specification of the product to be manufactured, implements a proper design procedure to carry out the IC design layout. The design procedure may include logic design, physical design, and/or place and route. As an example, a portion of the IC design layout includes various IC features (also referred to as main features), such as active region, gate electrode, source and drain, metal lines and vias of an interlayer interconnection, and openings for bonding pads, to be formed in and on a semiconductor substrate (such as a silicon wafer) and various material layers disposed over the semiconductor substrate. The IC design layout may include certain assist features, such as dummy features 14 shown in FIG. 1(b) for imaging effect, processing enhancement, and/or mask identification information.

Although a SEM picture provides generally useful image information, since a SEM picture has a limited FOV and a limited accuracy of the specimen stage, it is not able to tell exactly where the pattern it represents is located on a layout if there are similar patterns grouped together. For instance, when the image information contains a distinct feature 12 amidst dummy features 14 as shown in FIG. 1(a), and when such distinct feature is uniquely present in the examined portion 15 as shown in FIG. 1(b), it may not be difficult to locate the right pattern on the IC layout. Even in this case when a pattern has a distinct feature, however, if there were several places on the layout portion that contain the same feature (not shown) for example, it would be still quite difficult to determine an exact location of the pattern on an IC layout that the image information truly belongs to.

Figure 2A:
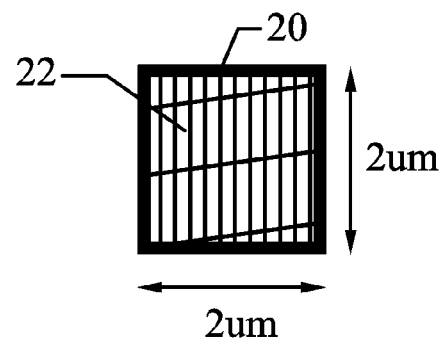
FIGS. 2 (*a*) and (*b*) show, respectively, image information of a second pattern from a SEM picture, and a second portion of an IC design layout being searched to locate the pattern.
Figure 2B:
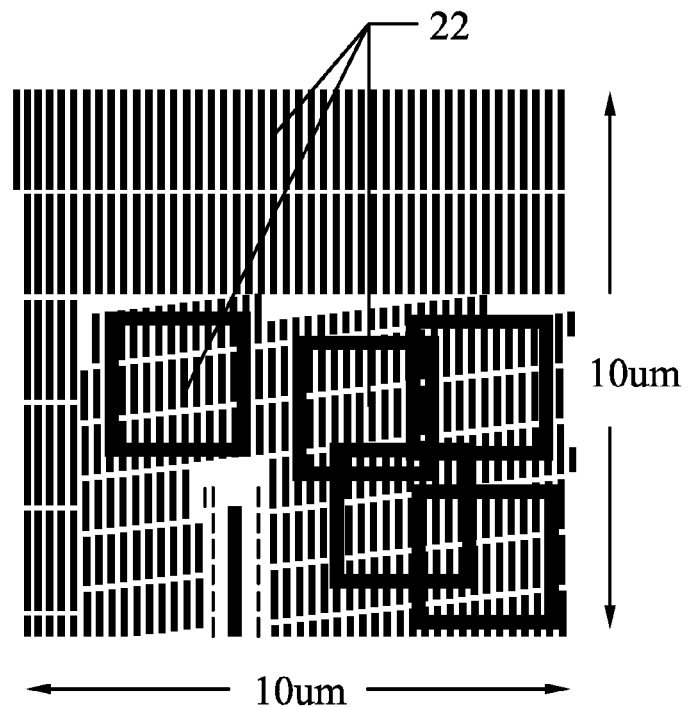

A more-difficult situation occurs when the image information of a particular pattern 20 is filled with dummy features or dummy features 22 as shown in FIG. 2(a). A typical IC layout may be filled with a plurality of periodic and similar, i.e., a substantially identically sized and configured, dummy features. Even in a small portion of the layout corresponding to a FOV, as in FIG. 2(b), there could be numerous possible locations for the pattern represented by the image information. When the area of search is extended to an entire exposure die, it is practically impossible to distinguish and find an exact location of a particular pattern filled with a group of dummy features from the image information provided from SEM pictures alone.

The dummy features, expressed as parallel bars in the pattern and layout in FIGS. 1 and 2, may be generated by an automatic program and inserted into an IC layout during the data preparation stage before the photomask writing. Rules of inserting dummy features, governing the sizes, shapes, pitches, and distances from main pattern, are confined by integration. Once inserted into an IC layout, they are expressed as the same shape in the photomask, wafers, and dies except that their shape on photomask might be slightly different after OPC is performed. One reason for inserting dummy features into a layout is to make a homogenous environment. This can help prevent various errors, such as dishing that can occur after chemical-mechanical polishing (CMP).

In the current disclosure, these dummy features are also used for locating a particular pattern being sought via HINT ("Hiding Information Technology") as described hereinafter. More specifically, particular dummy features in a pattern are purposefully designed to be modified in their size and position to be more distinguishable from other patterns in the IC layout. In other words, in each pattern, a distinction is encoded via modifications of a particular set of dummy features so that different patterns may become distinguishable from one another, and such encoded distinctions are carried forth into the fabricated wafers and dies. Then, from image information of SEM pictures taken from wafers or photomasks, one can readily identify those encoded distinctions and locate the particular pattern on an IC layout that has the same encoded distinctions. The use of HINT in the present disclosure is not limited to a locating purpose of a particular pattern. Through the use of HINT, in an embodiment, a designer may be able to insert other information into the pattern, such as manufacture company, chip ID, process conditions, . . . etc. The HINT can be extended even to EUV (Extreme Ultraviolet) lithography and EBDW (Electron Beam Direct Write) lithography. While applied with EBDW, the dummy pattern can be modified batch to batch, wafer to wafer, and even die to die.

Figure 3C:
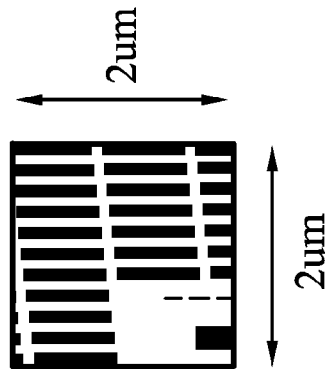
FIGS. 3 (*a*), (*b*), and (*c*) show, respectively, a wafer typically produced during a wafer processing of a semiconductor device fabrication, a die split out of the wafer, and a typical SEM picture containing image information of a particular pattern.
Figure 3B:
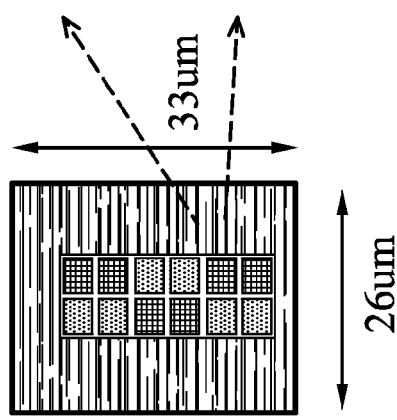
Figure 3A:
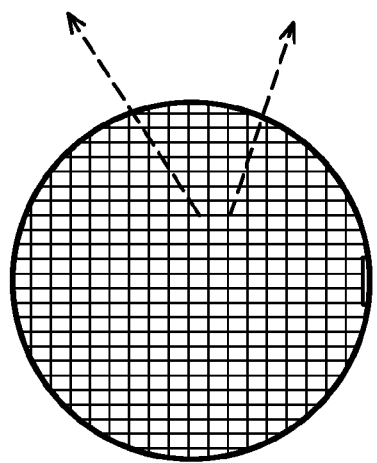

FIGS. 3 (a), (b), and (c) show, respectively, a wafer typically produced during a wafer processing of a semiconductor device fabrication, a die split out of the wafer, and a typical SEM picture containing image information of a particular pattern. A wafer is produced after going through a multiple-step sequence of processing steps, including one or more patterning steps, during which electronic circuits are gradually created on a wafer. Afterwards, the wafer is sawed into individual dies. A typical wafer can have a diameter of 12 inches or 300 millimeter ("mm"), and an example size of a layout on a wafer, corresponding to a single die, can be 33 mm by 26 mm as shown in FIG. 3(b). So in this very specific example, a wafer may contain about 67 dies. A typical SEM picture containing image information of a pattern has FOV of a dimension of 2 μm by 2 μm, as shown in FIG. 3(c). Therefore, to cover an entire region of a layout sized as in FIG. 3(b), using the above-described example, about $2.2 \times 10^8$ SEM pictures are needed. In other word, for a given SEM picture, it requires comparison of the SEM picture with $2.2 \times 10^8$ patterns on a layout to locate a particular pattern that the particular SEM picture is referring to. Without a special way of distinguishing such $2.2 \times 10^8$ patterns, it would be not only a very difficult, but practically an impossible task.

Figure 4:
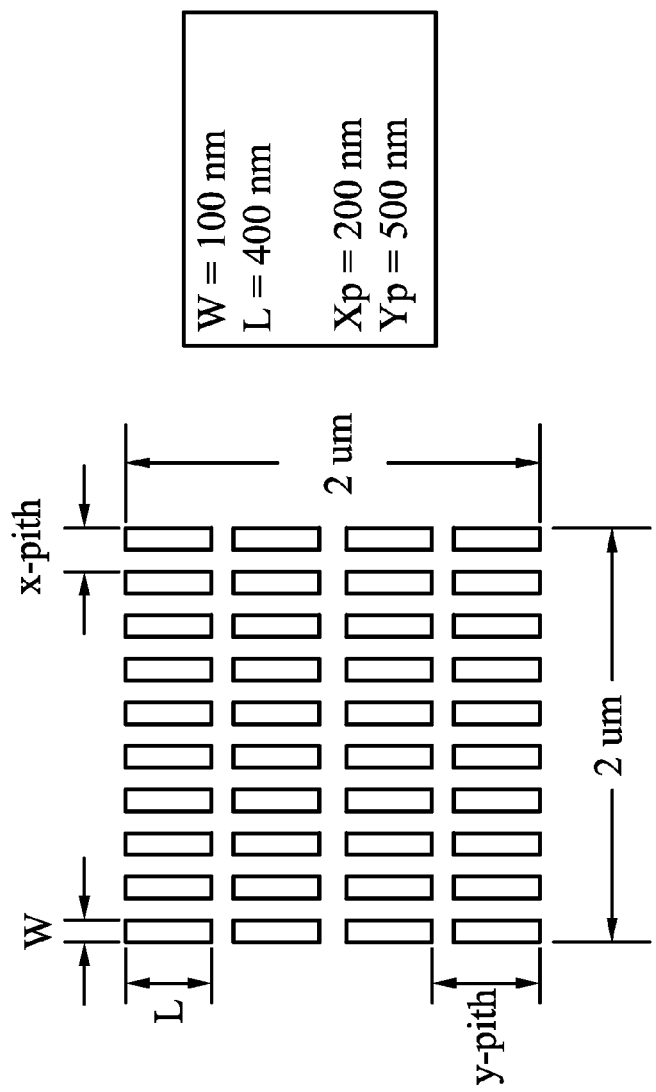
FIG. 4 shows a SEM picture of a pattern filled with dummy features inserted according to an aspect of the present disclosure.

FIG. 4 shows a SEM picture of a pattern filled with dummy features, shown by way of an example to describe how a pattern is distinguished by encoding distinctions into part of the dummy features therein according to an aspect of the present disclosure. In this particular example, the SEM picture may have a FOV of 2 µm by 2 µm, and the size of a single dummy is designed to have a width ("W") of 100 nanometers ("nm") and a length ("L") of 400 nm. If the horizontal pitch ("x-pitch", the distance between two respective centers of two neighboring dummy features) is set to be 200 nm, and the vertical pitch ("y-pitch", the distance between two respective centers of two neighboring dummy features) to be 500 nm, it can be easily shown that there can be 4×10=40 dummy features arrayed regularly in a rectangular fashion in the given SEM picture (considering 1 µm=1,000 nm).

Figure 5:
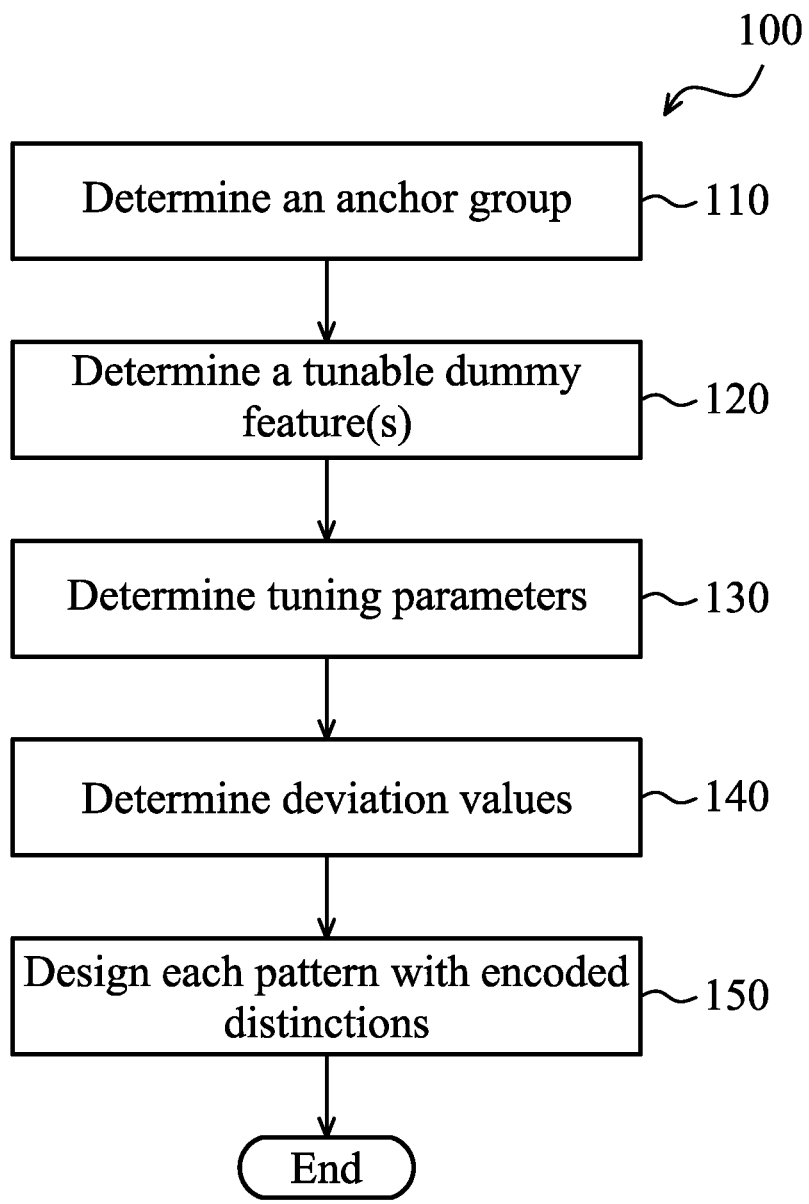
FIG. 5 is a schematic diagram showing a method of designing an IC design layout having a plurality of similar patterns in a way to distinguish patterns therein, according to an aspect of the present disclosure.

FIG. 5 is a schematic diagram showing a method 100 of designing an IC design layout in a way to distinguish patterns from a plurality of other otherwise identical patterns contained in the IC layout, according to an embodiment of the present disclosure. In one typical IC layout, covering an exposure die having size, for instance, 33 mm×26 mm, there could be about $2.2 \times 10^8$ small areas, each having the size of 2 µm by 2 µm, according to the calculation shown hereinbefore. Except for the regions having various IC features (also referred to as main features), such as active region, gate electrode, source and drain, metal lines and vias of an interlayer interconnection, and openings for bonding pads, each pattern may be filled with a plurality of substantially identical, substantially equally spaced dummy features, rendering numerous patterns still indistinguishable.

FIGS. 6 (a), (b), (c) show examples of a pattern 60 to be designed according to different aspects in the present disclosure. In these examples, each pattern 60 in an IC layout has a size of 2 µm×2 µm, the size of the FOV of a typical SEM picture, and contains 4×10=40 substantially identical, both in size and configuration, all bar shaped, and substantially equally spaced dummy features. Here, each dummy feature is designed to have 100 nm width, 400 nm length, 200 nm x-pitch, and 500 nm y-pitch.

At step 110, the designer first determines an anchor group of dummy features, which would be commonly present in all patterns that have encoded distinctions. The purpose for setting up these anchor dummy features is to help quickly identify and locate in a pattern a selected set of one or more tunable dummy features that carry encoded distinctions, and have a fixed relative spatial relationship with the anchor dummy features. In other word, the anchor group is used for anchoring the tunable dummy feature(s) in a given pattern. Determining the anchor group of dummy features during design stage may involve determining the number of the anchor dummy features to be used in each pattern, the individual positions of the chosen anchor dummy features that would determine the overall configuration of the anchor group, the types of observable parameters for each anchor dummy feature, and anchor values of parameters that will be assigned to each parameter. All of these characteristics may be used for identifying and locating the anchor group in a given pattern provided by, for example, a SEM picture.

For example, in an embodiment shown in FIG. 6(a), the anchor group 62 may be set to have eight dummy features (having a dashed fill-in) located at the upper left corner of the pattern 60 in such a way to form an overall rectangular configuration, enclosing a single tunable dummy feature 64 at its center. In another embodiment shown in FIG. 6(b), the anchor group 62 has the same eight dummy features, but is located at the lower middle of the pattern 60 forming a triangular configuration, similarly enclosing a tunable dummy feature 66 at its center. But in another embodiment, as shown in FIG. 6(c), the anchor group 62 may consist of, for example, ten dummy features, located lower right corner of the pattern 60 and enclosing two tunable dummy features 68 and 69. In other embodiments, as shown in FIGS. 7(a) and 7(c), the anchor group 62 may consist of a single anchor dummy feature, and further, the single anchor dummy feature may have a different size, i.e., a different width or length, from other surrounding dummy features for quick and easier identification and location. The number, size, and shape of anchor dummy features in a pattern and the overall configuration of an anchor group are a design choice and generally depends on the unique identifiability of the chosen anchor group in a pattern (because the bigger an anchor group is, the more likely it is uniquely identified in a given pattern), and also the number of tunable dummy features needed.

In the embodiments described in FIGS. 6 and 7, each anchor dummy feature may have anchor parameters consisting of the width, length, x-pitch and y-pitch of the anchor dummy feature, which are observable to identify and locate the anchor dummy features thereby. In one embodiment, all anchor dummy features in an anchor group may have identical set of values in the respective parameters. For instance, in the embodiments described in FIGS. 6(a)-6(c), all anchor dummy features may have a common set 61 of anchor parameter values of 100 nm in width ("W"), 400 nm in length ("L"), 200 nm in x-pitch ("$X_p$"), and 500 nm in y-pitch ("$Y_p$"). The anchor parameter values, however, may be set to be different from corresponding parameter values of the rest of the dummy feature in a given pattern, as shown in FIGS. 7(a) and 7(c), to ensure quicker and easier identification of the anchor group in the sea of all lookalike dummy features. Once the characteristics of an anchor group in one pattern have been determined, the anchor groups in all other patterns in a given IC layout are designed identically in its characteristics. Using these common predetermined characteristics for an anchor group, i.e., the number of the anchor dummy features, the particular configuration (relative position and orientation) between the anchor dummy features, and the parameter values of the individual anchor dummy features, one can easily and quickly identify an anchor group from a SEM picture that has been obtained from wafers or dies fabricated according to the same IC design layout.

In the embodiment described in FIGS. 6(a)-6(c), all anchor dummy features within the anchor group are set to have identical sizes (widths and lengths) and pitches. In another embodiment, however, each or some of the anchor dummy features may have different anchor parameter values from the rest in the group. For example, the widths of the eight anchor dummy features in FIG. 6(a) may be set to increase by, for instance, 2 nm, starting from 100 nm, for every anchor dummy feature in the counterclockwise order. The similar kind of variation may be applied to other anchor parameter values for the length, x-pitch, or y-pitch among the anchor dummy features within a same group. In the same spirit, the size of the anchor group (the number of anchor dummy features therein) and/or the configuration that the anchor dummy features make can be changed. For instance, even with the same number of eight anchor dummy features, the anchor group may form a triangle, as shown in FIG. 6(b), rather than a rectangle. As long as the characteristics of an anchor group (the number, configuration, anchor parameter values of the anchor dummy features) are uniquely determined and fixed throughout all patterns in an IC layout, any anchor group would serve the purpose of the method described in the present disclosure.

Now at step 120, are determined at least one tunable dummy features. The tunable dummy feature(s) are indeed the very indicator or carrier of encoded distinctions, to distinguish all otherwise similar looking patterns in an IC layout. Like the anchor dummy features, determining the tunable dummy features during design stage may involve determining the number of the tunable dummy features, and positions of the tunable dummy features, particularly in relation to the previously determined anchor dummy features.

Referring back to FIGS. 6(a) and (b), in these particular embodiments, the tunable dummy features 64 and 66 are set to be located at the center of the respective anchor groups 62. The tunable dummy features 64 and 66 have a fixed spatial relationship with respect to the respective anchor groups 62 or the individual eight anchor dummy features therein. They are always located at the center of, and surrounded by, the respective eight anchor dummy features. This fixed spatial relationship between the anchor and tunable dummy feature is common to all patterns. Whenever an anchor group of dummy features are identified and located in a pattern through their predetermined characteristics, the tunable dummy feature is always found at the center of them in these particular embodiments. In these embodiments, however, the location of the tunable dummy feature need not be located always at the center. For example, in FIG. 6(a), the tunable dummy feature may be set to the dummy feature 64-1 located right to the center anchor dummy feature among the three forming a right sideline of the anchor group. Still, in every other pattern, the tunable dummy feature will always be found at the identical position relative to the identical anchor group.

In the particular embodiments shown in FIGS. 6 (a) and (b), there is only one tunable dummy feature. But there could be more than one tunable dummy features, if needed, in another embodiment. How many tunable dummy features should be used for encoding purpose depends on how many patterns in a layout need to be distinguished. The more are there patterns to be distinguished, the more needed are tunable dummy features. The number of the tunable dummy features may be increased with, or without, changing the size and configuration of the anchor group, depending on embodiments. For instance, in FIG. 6(a), another tunable dummy feature 64-1 could be added to the dummy feature 64 with the same rectangular eight member anchor group. In this embodiment, the two tunable dummy features 64 and 64-1 will always have the same spatial relationship with respect to the rectangular anchor group in every other pattern. In another embodiment, the anchor group itself may be chosen to be bigger to carry or relate to more than one tunable dummy features. For example, in FIG. 6(c), the anchor group may consist of ten anchor dummy features in rectangular configuration enclosing two tunable dummy features 68 and 69.

FIGS. 7(a)-7(d), and FIGS. 8(a)-8(d) show other embodiments of the anchor dummy features and tunable dummy features combination. In all of these particular embodiments, it is chosen that there is only one tunable dummy feature 64, but in each embodiment, the tunable dummy feature 64 has a unique and fixed spatial and directional relationship with the anchor dummy features 62, and such relationship would remain the same throughout in all other patterns in an IC layout.

Once the number of tunable dummy features to be used in every pattern is determined, then at step 130, the tuning parameters to tune or vary the tunable dummy features thereby are determined. The tunable dummy features are encoded with distinctions via the variations of the tuning parameters from some predetermined equilibrium values. In some embodiments, described in FIGS. 6 and 7, the tuning parameters may be chosen to be the width, length, x-pitch and y-pitch of the tunable dummy feature(s), where each of the tunable dummy feature(s) may be varied, or deviated from an equilibrium size and configuration, in its width, length, x-pitch and/or y-pitch so as to give a unique distinction to the particular pattern it belongs to. The set of tuning parameters that are to be varied to tune the tunable dummy feature(s) from pattern to pattern may not be restricted to the width, length, x-pitch and y-pitch. In a different embodiment, the parameter set may further include, if needed, the angle by which tunable dummy feature is tilted from the upright position, or even the overall shape itself of an individual tunable dummy features. For instance, the bar-shaped tunable dummy features may be varied to slightly different shapes like oval or ellipsoidal shapes or even other polygons. If the tunable dummy feature varies in an overall ellipsoidal shape, for example, the tuning parameter may be the curvature or the lengths of two primary axes of the ellipse.

Now at step 140, it is determined by which deviation values each of the tuning parameters for a given tuning dummy feature may be deviated from predetermined equilibrium values to give a distinction to that tuning dummy feature, and resultantly to the pattern it belongs to. Naturally, this step may start with determining the equilibrium parameter values that would be common to all tunable dummy features in all patterns. In the embodiments shown in FIGS. 6(a)-6(c), the equilibrium parameter values of the tunable dummy feature (s) may be set to be same with the set 61 of anchor parameter values shared by the entire anchor group, i.e., 100 nm in widths, 400 nm in lengths, 200 nm in x-pitch, and 500 nm in y-pitch. In other embodiments, however, the equilibrium parameter values of the tunable dummy feature may be chosen to have different values to make the tunable dummy feature have different equilibrium size and configuration from the rest of the dummy features in a pattern. For instance, in the embodiment shown in FIG. 7(b), the equilibrium length of the single tunable dummy feature 64 may be 900 nm (the y-pitch, 500 nm plus the length of one of surrounding dummy features, 400 nm), and in the embodiment shown in FIG. 7(d), the equilibrium width of the single tunable dummy feature 64 may be 300 nm (the x-pitch, 200 nm plus the width of one of surrounding dummy features, 100 nm).

Once the equilibrium parameter values of each tunable dummy feature are determined, at the same step 140, the possible deviation values of each tuning parameter are determined. For the regularity and ease for encoding variations, it may be desirable that the deviation values for each tuning parameter may take finite discrete numbers increasing with a constant increment, rather than random numbers. So in this case, determining the possible set of deviation values of each tuning parameter may include determining how many deviation values are needed for each tuning parameter, and determining by how much increment the deviation value should change. In the embodiments described in FIGS. 6(a)-(c) or FIGS. 7(a)-7(d), the deviation values ("Δ") of each tuning parameter, from their respective equilibrium parameter values, may be set be chosen from a set 63 of discrete numbers of a constant interval as follows:

For the width (in "X" direction), $\Delta W = \pm 2, \pm 4, \pm 6, \pm 8, \pm 10$ nm;

For the length (in "Y" direction), $\Delta L = \pm 2, \pm 4, \pm 6, \pm 8, \pm 10$ nm;

For the x-pitch (in "X" direction), $\Delta X_p = \pm 2, \pm 4, \pm 6, \pm 8, \pm 10$ nm; and For the y-pitch (in "Y" direction), $\Delta Y_p = \pm 2, \pm 4, \pm 6, \pm 8, \pm 10$ nm.

In these particular embodiments, each tuning parameter can vary by 10 discrete values of a 2 nm interval. For instance, the width ("W") of a tunable dummy feature in FIGS. 6(a)-(c) or FIGS. 7(a)-7(c), can vary as 90, 92, 94, 96, 98, 102, 104, 106, 108, and 110 nm from its equilibrium value 100 nm, and the width of the tunable dummy feature in FIG. 7(d) can vary as 290, 292, 294, 296, 298, 302, 304, 306, 308, and 310 nm from its equilibrium value 300 nm. Similarly, in an embodiment where the tunable dummy feature varies in shape, for example, a varying ellipse, the deviation values of the tuning parameter may be discrete values in the curvature or the lengths of two primary axes of the ellipse.

Generally, the number of possible deviation values for each tuning parameter and the number of tunable dummy features are determined in consideration of the total number of patterns needed be distinguished in an IC design layout or a die, or even in a wafer, such that the total number of different combinations of tuning parameters for one or more tunable dummy features (i.e., the total number of different ways a set of tunable dummy features can be varied or deviated) can be larger than the total number of patterns to be distinguished. For instance, if there is only one tunable dummy feature as shown in FIGS. 6(a) and 6(b) or FIGS. 7(a)-7(d), and each tunable parameter can vary to 10 discrete values as shown above, the total number of ways a single tunable dummy feature can be differently tuned is, $10 \times 10 \times 10 \times 10 = 10^4$. So, in this particular embodiment, $10^4$ patterns can be differently encoded and distinguished. This number, however, may not be big enough to encode and distinguish therewith the entire patterns in an exposure die exemplified in FIG. 3, in which for a die of a typical size 33 mm×26 mm, there are about $10^8$ patterns. In this case still, the entire patterns may be encoded differently by tuning one more dummy feature. For example, if one more tunable dummy feature is used as in FIG. 6(c), then assuming each tuning parameter can vary in 10 values as above, the total number of ways that the 'entire set' of two tunable dummy features can be differently tuned is, $10^4 \times 10^4 = 10^8$, sufficiently covering the entire patterns in the example of FIG. 3.

Therefore, if there are more patterns that need to be distinguished, for example in a bigger die or in a whole wafer, the number of tunable dummy feature can be accordingly increased to cover them. In fact, increasing the number of tunable dummy features is not the only way of matching increased number of patterns to be distinguished during the design. Increasing either or both of the number of tuning parameters and the number of possible deviation values taken by each tuning parameter will also increase the total number of ways differently tuning the tunable dummy features. For instance, in the same example described above, if one more tuning parameter, such as an angle by which the tunable dummy feature in FIG. 6(a) is tilted from its upright position, is added to the set of four parameters, the total number of ways the single tunable dummy feature in FIG. 6(a) can be differently tuned would increase to, $10 \times 10 \times 10 \times 10 \times 10 = 10^5$. On the other hand, if the set of possible deviation values each tuning parameter takes consists of, for example, 14 values instead of 10, then with the same 4 tuning parameters and one tunable dummy feature, the total number would increase to, $14 \times 14 \times 14 \times 14 = 2.56 \times 10^6$. Which one to increase, among the numbers of the tunable dummy feature, the tuning parameters, or the possible deviation values, to encode a target number of patterns may depend on a variety of factors in the design stage of an IC layout. Practically, the easiest and most efficient way to generate a large number of different tuning may be to increase the number of the tunable dummy features, as illustrated in the previous examples of changing from one tunable dummy feature to two. Further, the potential set of tunable parameters that can be used for a simple two dimensional, bar-shaped dummy feature are very limited, so increasing the number of tuning parameters may not be very practical. Also, increasing the number of possible deviation values by, for instance, reducing the value of increment, can be limited by the resolution of a specific instrument providing the image information, such as a SEM picture, and therefore, may not be very efficient either. But still, these two ways are also within the contemplation of the present disclosure.

The magnitude of constant increment between the deviation values of the tuning parameters may be determined by consideration of the resolution power of a particular imaging device that provides the image information for a particular pattern. If the increment is set too small beyond the resolving power of that device, one may not discern or determine from the image information how much the tunable parameter has been deviated. The minimum magnitude of increment, therefore, is limited by the resolution of the imaging device. On the other hand, if the increment is set to be too big, then there would not be many selectable deviation values because a few deviations of a tunable dummy feature by that increment, whether in width, length, x-pitch, or y-pitch, would encroach on the neighboring dummy features.

The minimum magnitude of increment in deviation values of a tuning parameter may be obtained, in one embodiment of the present disclosure, as follows. Suppose the pattern obtained from a SEM picture has the FOV of 2 μm×2 μm, or 2000 nm×2000 nm. The typical SEM picture has a resolution of 1024×1024 pixels. Therefore, the minimum dimension of the pattern that can be resolved by the SEM picture is about 2 nm/pixel. If a deviation of a dummy feature in the pattern is smaller than this value, it may not be able to be picked up by the SEM picture and discerned. Therefore, in this particular embodiment with such a given resolution of the SEM picture, the minimum magnitude of increment in deviation values of a tuning parameter is better be set as 2 nm as shown in FIGS. 6(a)-(c).

Now at step 150, each pattern in an IC layout is designed with an anchor group of anchor dummy features with all characteristics determined at step 110 and the tunable dummy features with all characteristics determined from steps 120 thru 140. In each pattern, the anchor group is designed into the pattern to have an easy identifiable characteristic, such as having an identical size, configuration, location within the given pattern, and values for the same kind of corresponding parameter. Also, in each pattern, the tunable dummy feature (s) are designed into the pattern to have an identical location, or spatial relation, with respect to the anchor group of dummy features within the same pattern. In each pattern, however, the tunable dummy feature(s) are differently designed. More specifically, the set of tunable dummy feature(s) are deviated from predetermined equilibrium position and configuration, differently from pattern to pattern, by assigning deviation values to the respective tuning parameters such that all patterns within a layout, whether for a die or for a wafer, may become distinguishable from one another through differently deviated set of tunable dummy features.

In designing the patterns at step 150, not all tuning parameters of the tunable dummy feature between two neighboring patterns on a layout need to be different to distinguish them. For example, the tuning dummy feature of one pattern may be different from the corresponding tuning dummy feature in the neighboring pattern only in width by a constant increment, while the values of length, x-pitch, and y-pitch are same. Still the two patterns are distinguishable. If there are more than two tunable dummy features, only one tunable dummy feature need to be differently deviated, in whatever tuning parameter thereof, to give rise to distinctions between, for example, two neighboring patterns on a layout. In one embodiment, consecutive patterns in a layout may be designed in such a way that only one kind of the tuning parameter of a tunable dummy feature within respective patterns (assuming there is only one) is orderly varied. Here, the tuning parameter takes consecutive deviation values at a constant increment until all predetermined deviation values for that particular parameter become exhausted. Then, to continue to give distinctions to the next patterns, another kind of tuning parameter may be varied in the same manner. In another embodiment, the patterns, even consecutively located on a layout, may not need to be designed following such an ordered fashion.

The design of an IC layout according to the present disclosure is performed automatically by a computer program, which creates dummy features in each pattern and in doing so, gives desired deviations, in width, length, pitch, or any other characteristic, to a chosen dummy feature following some predetermined design scheme. After finishing designing, each pattern may be orderly indexed according to the kind and magnitude of deviation to the tunable dummy feature(s) by the computer program and stored in a data base.

Figure 9:
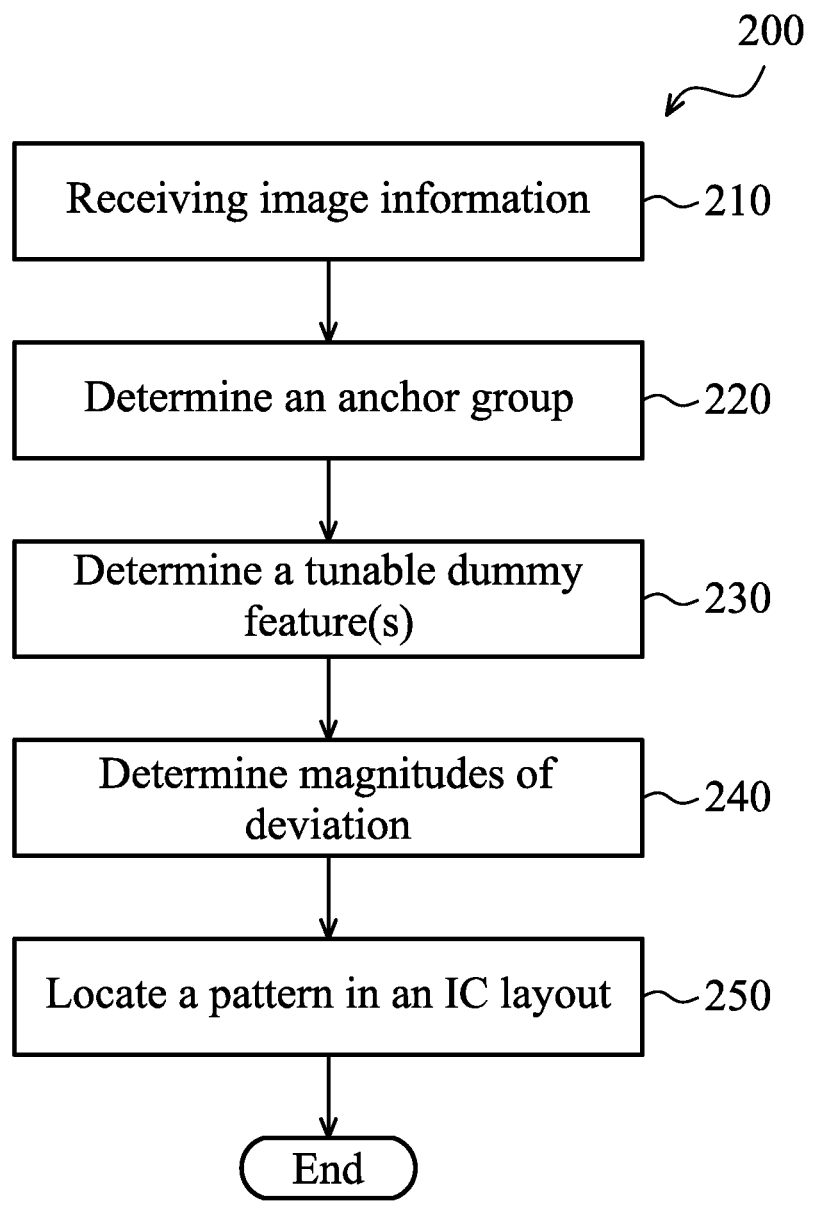
FIG. 9 is a schematic diagram illustrating a method of locating a particular pattern in an IC design layout designed according to an aspect of the present disclosure.

FIG. 9 is a schematic diagram illustrating a method 200 of locating a particular pattern in an integrated circuit design layout designed according to an embodiment of the present disclosure. The IC layout is designed according to the method 100 described in FIG. 5 of the present disclosure such that all patterns therein having a plurality of dummy features are distinguishable via encoded distinctions on a set of tunable dummy feature(s) in each pattern. And all patterns in the IC layout are indexed and stored in a data base, available for search and match.

At step 210, a digitalized picture of a particular pattern is provided to a computer system. The pattern has a plurality of dummy features of a substantially equal configuration and size, and in a substantially equal-spaced array both in horizontal and vertical directions. The picture may be, in an embodiment, a SEM picture taken from a wafer or a photomask. A suitably designed computer program reads the picture and extracts image information from it, which is then entered into the computer system for analysis.

At step 220, a processor of the computer system analyzes the extracted image information and therefrom determines an anchor group of dummy features within the pattern. The determination involves identifying and locating the anchor group within the pattern, based on information on the size of the anchor group (the number of anchor dummy features), the relative locations of the anchor dummy features that define an overall configuration of the anchor group, and the values of anchor parameters of individual anchor dummy features, all of which were predetermined and entered into the computer system.

Once an anchor group is identified and located, then at step 230, the processor determines, again from the image information, one or more tunable dummy features. Again, such determination involves identifying and locating the one or more tunable dummy features within the pattern, based on information on the number of the tunable dummy features to be located, and on their individual fixed spatial relationships with the anchor group determined at step 220, which were predetermined and entered into the computer system.

Once all tunable dummy features are identified and located, then at step 240, the processor determines, again from the image information, amounts or values of deviation in the tunable parameters from respective predetermined equilibrium values for each identified tunable dummy feature. The tuning parameters may be the width, length, x-pitch, or y-pitch of individual tunable dummy features in one embodiment, or other characteristics, such as an overall shape, of a dummy feature in another embodiment. The types of tunable parameters to be observed for each tunable dummy feature and their respective equilibrium or un-deviated values are predetermined and entered into the computer system.

Lastly, at step 250, the processor locates, by searching millions or billions of patterns of an IC design layout stored in a data base, a particular pattern that has exactly the same profile of characteristics of the tunable dummy features identified and determined at step 230 and 240. Each pattern of the IC layout in the data base carries a predetermined set of tunable dummy features that are designed to be encoded with distinctions (different deviations) from pattern to pattern. The characteristics of the tunable dummy features may include their number and individual relative positions with respect to the anchor group within the same pattern, and the individual tuning parameter values for each tunable dummy feature. For identifying and locating the tunable dummy features in each pattern being searched, the processor may utilize the information on the anchor group identified and determined at step 220.

By the methods described in the present disclosure enables similar and/or periodic patterns commonly filled with indistinguishable dummy features to be distinguished from one another, and thereby enables quick and easy locating of a particular pattern on an IC design layout from image information of a pattern extracted from, for example, a SEM picture. Encoding deviations or distinctions into a set of chosen dummy features in each pattern inflicts no impact to any mask manufacturing process including fracturing, writing, processing, inspection, and repairing, or to any wafer process including exposure, processing, and inspection. It may inflict, if any, only minor impact to OPC process.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. For example, the above disclosure discusses adding the dummy features during the design phase. In the alternative, the dummy features can be added after tapeout, such as before, during, or after OPC or other mask-preparation process that a fab or mask-making facility may implement. Also, the dummy features are illustrated as bars in the disclosure above. It is understood that the dummy features can take on different shapes, such as circles, symbols, or polygons. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of making an integrated circuit ("IC") design layout in a way to distinguish a plurality of similar patterns contained therein, each of the patterns comprising a plurality of dummy features, the method comprising:

identifying an anchor group of anchor dummy features as a subset of the plurality of dummy features in each of the patterns, the anchor group being present in each of the patterns and having identical configuration, size, and location thereof;

identifying at least one tunable dummy feature as a subset of the plurality of dummy features in each of the patterns, the at least one tunable dummy feature having a fixed spatial relationship with the anchor group of the respective pattern;

determining tuning parameters to be varied for having the at least one tunable dummy feature deviated;

determining, for each tuning parameter, deviation values by which the tuning parameter can be varied; and using a computer, varying the at least one tunable dummy feature in each of the patterns by at least one of the deviation values in such a way that different patterns become distinguishable from one another through the tunable dummy features so varied.

2. The method of claim 1, wherein the tuning parameters are selected from a group consisting of a width, a height, an x-pitch, a y-pitch, or a shape of each tunable dummy feature.

3. The method of claim 2, wherein for each tuning parameter, the deviation values are discrete numbers of a constant interval.

4. The method of claim 1, wherein the deviation values are determined in consideration of a resolution of a picture from an inspection tool such that the magnitude of deviation of each tunable dummy feature can be discernible from the picture.

5. The method of claim 1, wherein identifying the at least one tunable dummy feature includes:
determining the number of the tunable dummy features common to all the patterns, and
determining positions of the tunable dummy features common to all the patterns.

6. The method of claim 5, wherein the number of the tunable dummy features is determined in consideration of the number of patterns to be distinguished in the IC design layout.

7. The method of claim 1, further comprising determining equilibrium values to be respectively assigned to the tuning parameters of each tunable dummy feature.

8. The method of claim 1, wherein identifying the anchor group of anchor dummy features includes:
determining the number of the anchor dummy features common to all the patterns,
determining positions of the anchor dummy features common to all the pattern, and
determining anchor parameters and anchor values to be respectively assigned thereto for each anchor dummy feature.

9. The method of claim 8, wherein, within each of the patterns, the anchor dummy features share a common set of the anchor parameters and the anchor values.

10. The method of claim 8, wherein in all the patterns, the anchor dummy features share a common set of the anchor parameters and the anchor values.

11. An integrated circuit (IC) layout comprising a plurality of resembling patterns, each of the patterns comprising,
a plurality of dummy features arrayed in a substantially regular fashion, each dummy feature having an identical set of observable parameters, each observable parameter having a numerical value, the plurality of dummy features comprising:
an anchor group of anchor dummy features, wherein in all the patterns, any two correspondingly situated anchor dummy features share a common set of the numerical values with respect to the observable parameters thereof; and
one or more tunable dummy features, each of the tunable dummy features having a fixed predetermined spatial relationship with the anchor group of anchor dummy features, wherein the tunable dummy features in each of the patterns have unique sets of the numerical values with respect to the observable parameters thereof such that any two of the patterns can be distinguished by their respective tunable dummy features.

12. The IC layout of claim 11, wherein the observable parameters for each dummy feature are chosen from a group consisting of a width, a height, an x-pitch, a y-pitch, and a shape of the respective dummy feature.

13. The IC layout of claim 11, wherein the numerical value for each observable parameter of the tunable dummy features is chosen from a set of discrete numbers of an equal interval.

14. The IC layout of claim 13, wherein the constant interval is equal to a minimum dimension that a picture from an inspection tool of a given resolution is capable of resolving.

15. The IC layout of claim 11, wherein all the anchor dummy features within each pattern share a common set of the numerical values assigned to the respective observable parameters.

16. The IC layout of claim 11, wherein in all the patterns, the respective anchor groups have identical number of the anchor dummy features, identical configuration, and identical location in the respective patterns.

17. A method comprising:
receiving an integrated circuit design layout in a computer-readable medium, wherein the integrated circuit design layout includes a plurality of patterns, each of the patterns includes an anchor group of dummy features and a set of at least one tunable dummy feature that has a fixed predetermined spatial relationship with the anchor group, the anchor group of each of the patterns has a predetermined configuration, size, and location thereof, the anchor group is identical in each of the patterns, and the set of at least one tunable dummy feature is different in each of the patterns;
receiving image information of a first pattern to be located in the IC design layout;
determining, from the image information, a first anchor group of dummy features of the first pattern based on the predetermined configuration, size, and location;
determining, from the image information, a first set of at least one tunable dummy feature of the first pattern based on the fixed predetermined spatial relationship with the first anchor group; and
using a computer, locating one of the plurality of patterns in the integrated circuit design layout by matching the set of at least one tunable dummy feature of the one of the plurality of patterns to the first set.

18. The method of claim 17,
further comprising, before the locating one of the plurality of patterns:
determining, from the image information, magnitudes of deviation in size and position by which each of the first set is deviated from a predetermined equilibrium size and position,
wherein the matching uses the magnitudes of deviation.

19. The method of claim 18, wherein the deviation in size includes deviation in width, height, or both.

20. The method of claim 18, wherein the deviation in position includes deviation in x-pitch, y pitch, or both.

* * * * *